United States Patent [19]

van Montfoort et al.

[11] 4,052,336

[45] Oct. 4, 1977

[54] PROCESS FOR PREPARING NOBLE METAL CATALYSTS

[75] Inventors: Abraham van Montfoort, Geleen; Joseph J. F. Scholten, Sittard, both of Netherlands

[73] Assignee: Stamicarbon, B.V., Geleen, Netherlands

[21] Appl. No.: 665,442

[22] Filed: Mar. 9, 1976

[30] Foreign Application Priority Data

Mar. 13, 1975 Netherlands .................. 7502968

[51] Int. Cl.² .................. B01J 23/40; B01J 23/42; B01J 23/44; B01J 21/18
[52] U.S. Cl. .................. 252/447; 252/444
[58] Field of Search .................. 252/447, 444

[56] References Cited

U.S. PATENT DOCUMENTS

| 3,138,560 | 6/1964 | Keith et al. ............... 252/447 |
| 3,663,166 | 5/1971 | Weise et al. ............. 252/447 X |
| 3,736,266 | 5/1973 | Schrage ................... 252/447 |
| 3,804,779 | 4/1974 | Kent et al. ................ 252/447 |

Primary Examiner—Patrick P. Garvin
Attorney, Agent, or Firm—Cushman, Darby & Cushman

[57] ABSTRACT

The invention relates to a process for preparing active noble-metal catalysts on a carbon carrier. In particular, the process comprises adsorbing a salt of the catalytically active metal onto the carbon in an aqueous medium; hydrolyzing said salt to the oxide or hydroxide, by employing a basic reagent; and reducing said oxide or hydroxide to the metal.

13 Claims, 1 Drawing Figure

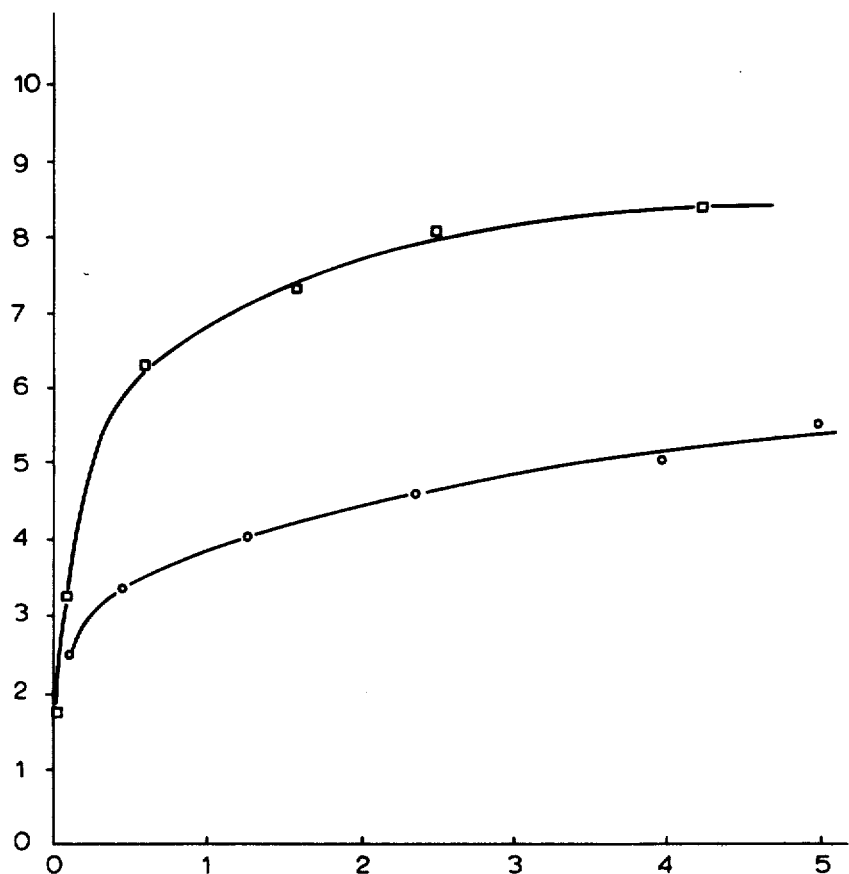

PROCESS FOR PREPARING NOBLE METAL CATALYSTS

BACKGROUND OF THE INVENTION

Art recognized processes for preparing palladium-on-carbon catalysts include the steps of forming a slurry from active carbon particles in an acid aqueous solution of a palladium compound; increasing the pH of said slurry to at least 12 by adding an alkali- or alkaline earth-metal hydroxide solution, as a result of which palladium hydroxide precipitates on the active carbon; reducing palladium hydroxide to metallic palladium, for instance, by adding to the slurry a reducing agent like formaldehyde, hydrazine or sodium formate (see U.S. Patent No. 3,736,266).

Inherent disadvantages of that known process are that a proper control of the addition of the reagents is to be heeded and that precipitation can only be carried out with the aid of alkali- or alkaline earth-metal hydroxides, since the required pH value is not achieved with carbonates and bicarbonates. Furthermore, if the preparation of the catalyst is undertaken according to that known process, the palladium salt, (after basic hydrolysis to $Pd(OH)_2$ or $PdO.x\ H_2O$, followed by reduction to Pd with, for instance, formaldehyde), is deposited in the form of coarse Pd metal crystallites whose active catalytic surface area is relatively small relative to the amount of metal precipitated. Coarse crystallites are understood to be crystallites having diameters exceeding 100 A. A relatively low activity is to be expected, therefore.

Another process, disclosed in U.S. Pat. No. 3,138,560, for preparing active palladium-on-carbon catalysts, is undertaken by impregnating basically reacting carbon with a palladium salt solution containing an oxidizing agent, for instance $H_2O_2$, as a result of which palladium hydroxide or palladium oxidehydrate precipitates on the carbon; and then reducing the precipitate to metallic palladium. The oxidizing agent in this process serves to avoid reduction of the hydroxide or oxidehydrate during the hydrolysis of the palladium salt. Disadvantages of this process are that the carbon must be pretreated to provide a sufficient number of active basic sites on the carbon surface area, and that the palladium salt solution must invariably contain an oxidizing agent, though nevertheless, large Pd metal crystallites inevitably result.

U.S. Pat. No. 3,663,166 discloses preparation of platinum catalysts which are suitable for the reduction of NO to hydroxylamine by starting with a solution of a platinum salt in water; by adjusting the pH of the solution to a value of between 4.5 and 9 by means of an alkali-metal hydroxide or a alkali-metal carbonate; by subsequently adding the carbon carrier and heating the mixture so that hydrolysis occurs and $Pt(OH)_4$ precipitates on the carbon; whereupon, the mass is separated, washed and reduced with $H_2$ in a 2–4 N sulphuric acid medium, or with formic acid in an aqueous suspension. The disadvantage of this process is that it is laborious and also gives rise to formation of coarse Pt metal crystallites.

The purpose of the invention is to provide a process for preparing highly active noble metal catalysts, in which the above objections, notably the laboriousness and/or the formation of coarse metal crystallites, are avoided.

SUMMARY OF THE INVENTION

The invention relates to a process for preparing noble metal catalysts applied to a carbon carrier by adsorbing a salt of the catalytically active metal onto the carbon in an aqueous medium, by causing the adsorbed salt to decompose under the influence of a basic reagent to the oxide or hydroxide and by reducing the oxide or hydroxide to the metal. The invention is characterized in that an active carbon with a large internal surface area is employed, in which the ratio between the pore volumes of the macro-pores plus transition pores and the total pore volume lies between 0.6 and 1.0, and in that the hydrolysis of the noble metal salt and the reduction of the oxide or hydroxide formed thereby are carried out in a single processing step with liquid hydrolyzing and reducing agents.

DESCRIPTION OF THE INVENTION

Each of the elements of the invention, as set forth in the SUMMARY OF THE INVENTION will be discussed below.

Micro-pores of the carrier are here understood to include pores with a radius below 10 A, transition pores having a radius of between 20 and $10^3$ A and macro-pores of above $10^3$ A. The internal surface area depends on the number of pores and the distribution of the pore size. The internal surface area of the active carbon is at least 300 $m^2/g$ to approximately 1500 $m^2/g$. A surface area of about 1000 $m^2/g$ is quite satisfactory. The internal surface area can be determined according to the BET-method by means of physical adsorption of nitrogen at $-196°$ C. In the preparation of the catalysts according to the invention, preferably an active carbon, in which the ratio between the pore volumes of macro-plus transition-pores and the total pore volume amounts to at least 0.7, is employed.

A pore size distribution of this kind, in which the above-mentioned ratio lies between 0.6 and 1.0 occurs in the so-called 'liquid carbon', an active carbon, specially suited for handling liquids. In the case of these types of carbon, if the hydrolysis and the reduction are carried out according to the invention in one process step with liquid reducing agents, the noble metal is deposited, as required, in very small crystallites.

If the volume of the macro-pores of a certain carbon is too low, this volume may be enlarged according to conventional methods, for instance, by treatment of the carbon with carbon dioxide and/or steam at temperatures between 800° and 1000° C. The pore volumes and the pore radii can be determined by means of mercury porosimetry; in case of pores having radii of less than 300 A, by means of capillary condensation of nitrogen.

The grain size of the active carbon may vary and lie between 1 and 60 microns in diameter. Preferably, the grain size distribution is such that at least 35% by weight of the particles has a diameter smaller than 1 microns. This particle size distribution can very accurately be determined with a so-called Coulter Counter.

The hydrophilic carbon types, whose surface is rich in oxygen and which are well dispersible in water, are highly suitable for the catalysts according to the invention. Dispersed in distilled water, these carbon types give an acid to neutral reaction (pH $\leq 7$). Hydrophobic kinds of carbon on the other hand have a surface which is poor in oxygen. Dispersed in pure water, they give a basic reaction and without further treatment are less suitable as carrier material for the present catalyst. The hydrophobic character may be transformed into a hydrophilic character by heating the carbon in air at 300°-350° C.

In order that active catalysts are obtained it is important that the carrier is not impregnated with the noble-metal salt solution, in which, after removal of the solvent, the total amount of noble metal remains behind on the carrier material; rather, in accordance with the invention it is critical that a thin layer of the metal salt is deposited on the carbon surface through physical adsorption. For, only in the latter case will the required small metal crystallites form as a result of the combined hydrolysis-reduction. The quantity of noble metal applied in this way to the catalyst carrier may vary within wide limits, for instance, between 0.1 and 15% by weight, based on the weight of the ultimate catalyst. The amount of carrier dispersed per liter of noble metal solution ranges from 10 to 3300 g.

The amount of noble metal that can be applied to the active carbon appears to depend not only on the internal surface area and the concentration of the noble-metal salt solution, but also on the ash content of the active carbon. Carbon types with a low ash content have a greater absorption capacity for noble metal. This in indicated more clearly in the FIGURE. The lower line shows the situation for carbon known in trade as Norit SX-2, an active carbon having a BET surface area of 1090 m²/g and an ash content of 3.5%, whilst the upper line indicates the situation for carbon known in trade as Carbopuron 4N with a BET surface area of 800 m²/g and an ash content of 0.33%. Either type of carbon has previously been dried in air at 120° C for an identical period of time. On the abscis is represented the number of mmol $H_2PdCl_4/1$ solution and on the ordinate the number of Pd-atoms/m² BET-surface ($\times 10^{-17}$).

Suitable hydrolyzing agents are solutions of alkaline reaction, especially the carbonates and bicarbonates of the alkali metals (including sodium, lithium, rubidium, cesium and potassium) and of ammonium. These hydrolyzing agents are dissolved in water to form solutions ranging from 0.1 to 1.0 molar, in concentration, based on the total amount of metal salt loaded carrier dispersion and hydrolyzing agent.

Reduction in the presence of the hydrolyzing agents mentioned above is preferably carried out with the aid of methanol. However, also with formic acid, formaldehyde and mixtures of methanol, formic acid and/or formaldehyde the required results are achieved. During the hydrolysis and the reduction the temperature is maintained at a value lying between 60° and 100° C. By preference, a temperature of approximately 80° C is applied.

The process according to the invention results in the great advantage over the known processes that highly active noble metal catalysts can be obtained in a rather simple manner, in which the noble metal is deposited on the carrier in the form of very small crystallites and in which, in comparison with catalysts prepared according to known processes, a higher catalytic activity is obtained per gram of noble metal. Therefore, relatively little expensive noble metal is required.

By the process according to the invention catalysts based on the noble metals from Group VIII of the Periodic System of Elements can be obtained, notably, platinum, iridium, osmium, rhodium and ruthenium, or mixtures or alloys of these metals. One or more noble-metal salt solutions stable (and soluble) in an acid medium may then be started from, for instance, the chlorides or complex compounds of noble metals. If required, the catalysts may be promoted and/or activated by addition of promoters and/or activators like germanium or tin, for instance, according to the process described in Dutch Patent Application No. 7,316,236. The solutions of the noble metal is of a concentration ranging from 0.1 g/l to 30 g/l, based on said carrier dispersion plus metal salt solution.

The catalysts according to the invention may be used as catalysts in all processes in which noble metal catalysts are conventionally employed, for instance, oxidation processes, hydrogenation processes, desulphurization processes. Highly suitable are palladium-on-carbon or palladium-platinum-on-carbon catalysts, prepared according to the process of the invention, for catalyzing the hydroxylamine preparation by reduction of nitrate ions or nitrogen monoxide with hydrogen in an acid medium.

The invention will be elucidated in more detail with the aid of the following examples of realization, however, without being limited thereto.

EXAMPLE I

For preparation of a number of Pd catalysts on active cabron, 95 g of a few hydrophilic active carbon types were dried for 20 hours, in a drying furnace, at 120° C. The carbon, which had a grain size not in excess of 60 microns, with 35% by weight below 10 microns, was subsequently dispersed with stirring in 500 cm³ of distilled water during half an hour, the PH value being decreased to 1.5 with hydrochloric acid. Next, with continuous stirring, a solution consisting of 20 g of $PdCl_2$, 20 cm³ of HCl (s.g., 1.19) and 50 cm³ of distilled water was added rapidly at room temperature. Stirring was continued for 2 more hours. The catalyst mass was then separated from the liquid over a glass filter and dried for 20 hours at 120° C.

Whilst stirred, the dried mass was subsequently transferred to 800 ml of distilled water of 90° C which contained 50 g of $NaHCO_3$ and 100 ml of methanol. Stirring was continued for 1 hour. During this treatment, evident hydrolysis of the $PdCl_4$ to $Pd(OH)_2$ or $PdO.x\ H_2O$ and reduction of the $Pd(OH)_2$ to metallic palladium occurs simultaneously according to the reaction equations:

$PdCl_4^{--} \rightleftarrows PdCl_2 + 2\ Cl^-$

$PdCl_2 + H_2O \rightarrow PdO + 2\ H^+ + 2\ Cl^-$

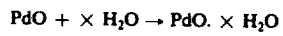

$PdO + x\ H_2O \rightarrow PdO.\ x\ H_2O$

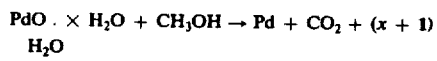

$PdO\ .\ x\ H_2O + CH_3OH \rightarrow Pd + CO_2 + (x + 1)\ H_2O$

The catalyst was filtered over a glass filter, washed out until the presence of chloride ions could no longer be demonstrated, and dried in the air at 120° C. for 20 hours.

With the catalyst so obtained hydroxylamine was prepared from nitrate ions at 30° C., in which hydrogen gas was passed (80 liters/hour) into one liter of aqueous buffer solution containing 207 cm³ of phosphoric acid (85%), 82 g of sodium hydroxide, and 198 g of $NaNO_3$ and in which 750 mg of the relevant catalyst had been dispersed. The activity of the catalysts was measured and expressed in g of hydroxylamine/g of metal/hour. The free metal surface area was derived from the extensiveness of the chemosorption of carbon monoxide according to the method published by P. H. Emmett c.s. in J.A.C.S. 60, 309 (1938) and J.A.C.S. 62, 1732 (1940).

The results of the measurements are shown in Table I. The tests nos. 1 to 4 inclusive, have been conducted with catalysts prepared according to the process of the invention. The tests nos. 5 and 6 are comparative tests; test no. 5 has been conducted with a catalyst prepared according to the process described in U.S. Pat. No. 3,663,166, and test no. 6 with a catalyst reduced with hydrogen gas at 400° C. (not according to the invention).

tests nos. 1 and 2 with nos. 3 and 4 shows that carriers having a smaller internal surface area have a slightly lower activity.

EXAMPLE II

In the same way as described in Example I, a number of catalysts were prepared starting from a mixture of aqueous solutions of $H_2PdCl_4$ and $H_2PtCl_6$ and different active carbon types, in such a way that the catalysts obtained invariably contained 8.3% by weight of Pd and 1.7% by weight of Pt, referred to active carbon plus metal.

TABLE I

| Catalyst According To Test No. | BET Surface Area Of The Carbon $m^2/g$ | Free Metal Surface Area $m^2$ of Pd/ g of Pd | Ratio Macro-Plus Transition-Pore Volumes/Total Pore Volume | Activity g of hydro-xylamine/g of Pd/h |
|---|---|---|---|---|
| 1. 9.5% by w. of Pd on Norit SX-2 | 1090 | 125 | 0.76 | 23 |
| 2. 9.5% by w. of Pd on Norit SX-2 | 1090 | 125 | 0.76 | 22.4 |
| 3. 9.5% by w. of Pd on Norit SX-2, different sample | 870 | 93 | 0.75 | 19.2 |
| 4. 9.4% by w. of Pd on Carbo-puron 4N | 895 | 125 | 0.70 | 19.9 |
| 5. 9.6% by w. of Pd on Norit SX-2 (according to U.S. Patent Spec. 3,663,166) | 1090 | 57 | 0.76 | 17.5 |
| 6. 10.6% by w. of Pd on Norit SX-2 (reduction with $H_2$ at 400° C.) | 1090 | 36 | 0.76 | 6.7 |

Table I shows that catalysts prepared according to the process of the invention (Nos. 1, 2, 3 and 4) have a larger metal surface area and a higher activity than the catalysts prepared in another way. Comparison of the The results of the measurements are rendered in Table II.

TABLE II

| Catalyst Type According To Test No. | BET Surface Area Of The Carbon $m^2/g$ | Macro-Plus Transition Pore Volumes $cm^3/g$ | Ratio Macro-Plus Transition-Pore Volumes/Total Pore Volume | Activity g of hydro-xylamine/g of Pt · 9 per hour |
|---|---|---|---|---|
| 7. 8.3% by w. of Pd + 1.7% by w. of Pt on active carbon of Messrs Sutcliff (from coconut) | 1131 | 0.25 | 0.46 | 14 |
| 8. 8.3% by w. of Pd + 1.7% by w. of Pt on active carbon of Messrs Sutcliff (from mineral coal) | 932 | 0.35 | 0.57 | 20 |
| 9. 8.3% by w. of Pd + 1.7% by w. of Pt on active carbon of Messrs Pittsburgh, type OL (from bitumen) | 1277 | 0.35 | 0.57 | 15 |
| 10. 8.3% by w. of Pd + 1.7% by w. of Pt on active carbon of Messrs Degussa, type 114 Np (from wood) | 750 | 0.68 | 0.70 | 38 |
| 11. 8.3% by w. of Pd + 1.7% by w. of Pat on active carbon of Messrs Norit, type SX-2 (from peat) | 1098 | 0.96 | 0.76 | 44 |

Table II shows that catalysts whose carbon carrier has a great macropore volume have a substantially higher activity than catalysts with a small macro-pore volume.

EXAMPLE III

In the same way as described in Example I, catalysts were prepared starting from hydrophilic carbon and hydrophobic carbon. With the aid of the catalysts obtained hydroxylamine was prepared in the way describer in Example I. The results of the tests are rendered in TableIII.

TABLE III

| Catalyst Type According To Test No. | BET Surface Area Of The Carbon m²/g | Metal Surface Area m² of Pd/g of Pd | Ratio Macro-Plus Transition-Pore Volumes/Total Pore Volume | Activity g of hydro-xylamine/g of Pd/h |
|---|---|---|---|---|
| 12. 9.4% by w. of Pd on active carbon, type Carbopuron 4N (from wood); hydrophilic carbon | 895 | 125 | 0.70 | 19.9 |
| 13. 12.9% by w. of Pd on active carbon, type Carbopuron 4N (from wood); hydrophobic carbon | 880 | 51 | 0.70 | 11.7 |

Table II shows that a catalyst prepared with active carbon of a hydrophilic character has a considerably larger metal surface area and, hence, a considerably higher activity than has the same active carbon type with a hydrophobic character.

What is claimed is:

1. In a process for preparing active noble-metal catalyst on a carbon carrier by adsorbing at least one water-soluble salt of a catalytically active metal onto the carbon in an aqueous medium, by hydrolyzing said salt by treating the salt with a basic reagent to form the oxide or hydroxide, and by reducing said oxide or hydroxide to the metal, the improvement comprising employing an active carbon having an acid to neutral reaction in water and an internal surface area of at least 300 m²/g and up to about 1000 m²/g with a particle size between 1 and 60 microns and with an ash content that does not exceed 3.5% by weight, whose ratio between (1) the pore volume, of the pores between 20 to 1000A plug the pores exceeding 1000A and (2) the total pore volume of said particles lies between 0.6 and 1.0 whereby the hydrolysis of the noble metal salt and the reduction of the oxide or hydroxide formed thereby are carried out in a single processing step with liquid hydrolyzing and reducing agents.

2. Process according to claim 1, wherein the ratio between the volumes of the macro-pores plus the transition pores and the total pore volume amounts to at least 0.7.

3. Process according to claim 1, wherein the active carbon has hydrophilic properties.

4. Process according to claim 1, wherein the active carbon is poor in ash.

5. Process according to claim 1, wherein the reduction of the noble metal oxide or hydroxide in the presence of hydrolyzing agents is carried out with methanol.

6. Process according to claim 1, wherein the reduction of the noble oxide or hydroxide in the presence of hydrolyzing agents is carried out with formaldehyde.

7. Process according to claim 1, wherein the reduction of the noble metal oxide or hydroxide in the presence of hydrolyzing agents is carried out with formic acid.

8. Process according to claim 1, wherein the reduction of the noble metal oxide or hydroxide in the presence of hydrolyzing agents is carried out with a mixture of at least two members of the group consisting of methanol, formaldehyde and formic acid.

9. Process according to claim 1, wherein decomposition of the noble metal salt and the reduction of the resulting noble metal oxide of hydroxide are carried out at a temperature of 60°- 100° C.

10. Process according to claim 1, wherein said salt is one or more salts or complex compounds of the noble metals from Group VIII of the Periodic System of elements which are stable in an acid medium.

11. Process according to claim 1, whrein a plladium catalyst is prepared.

12. Process according to claim 1, wherein a palladium platinum catalyst is prepared.

13. In a process for the preparation of supported catalyst comprising treating at least one water-soluble salt or complex of a noble metal of Group VIII in the presence of a carrier with a base to form the oxide or hydroxide of said salt on the carrier and then reducing said oxide or hydroxide to form the free metal of the oxide or the hydroxide on said carrier, the improvement comprising using as a carrier an active carbon having a large internal surface area whose ratio between (1) the pore volumes of the macro pores plus the transition pores and (2) the total pore volume lies between 0.6 and 1.0, and dispersing the carrier in an aqueous solution of said salt; treating the carrier dispersion of the aqueous solution in a single step with (A) and (B) wherein (A) is a carbonate, or a bicarbonate of an alkali metal or ammonium and (B) is methanol, formic acid, formaldehyde, or mixtures thereof, thereby effecting (a) precipitation of said salt and adsorption of the salt onto the carrier and (b) reduction of the precipitate to the free metal.

* * * * *